US010496171B2

(12) United States Patent
Bella et al.

(10) Patent No.: US 10,496,171 B2
(45) Date of Patent: Dec. 3, 2019

(54) ELECTROMECHANICAL ACTUATORS FOR HAPTIC FEEDBACK IN ELECTRONIC DEVICES

(71) Applicant: SABIC Global Technologies B.V., Bergen op Zoom (NL)

(72) Inventors: Redha Bella, Thuwal (SA); Mahmoud N. Almadhoun, Thuwal (SA); Jesus Alfonso Caraveo Frescas, Thuwal (SA); Ibrahim Al-Howaish, Thuwal (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 141 days.

(21) Appl. No.: 15/536,462

(22) PCT Filed: Jun. 3, 2016

(86) PCT No.: PCT/IB2016/053276
§ 371 (c)(1),
(2) Date: Jun. 15, 2017

(87) PCT Pub. No.: WO2016/207750
PCT Pub. Date: Dec. 29, 2016

(65) Prior Publication Data
US 2018/0004293 A1    Jan. 4, 2018

Related U.S. Application Data

(60) Provisional application No. 62/185,515, filed on Jun. 26, 2015.

(51) Int. Cl.
*G06F 3/01*        (2006.01)
*G09B 21/00*    (2006.01)
(Continued)

(52) U.S. Cl.
CPC ............ *G06F 3/016* (2013.01); *G06F 3/044* (2013.01); *G06F 3/0414* (2013.01);
(Continued)

(58) Field of Classification Search
CPC ........... G06F 3/016; G06F 2203/04112; G06F 3/0414; G06F 3/044; G09B 21/003; G09B 21/004
See application file for complete search history.

(56) References Cited

U.S. PATENT DOCUMENTS

| 4,801,835 A | 1/1989 | Nakaya et al. ............... 310/358 |
| 6,863,943 B2 | 3/2005 | Wang et al. .................... 428/37 |

(Continued)

FOREIGN PATENT DOCUMENTS

| CN | 101798429 | 8/2010 |
| EP | 2465020 | 2/2015 |

(Continued)

OTHER PUBLICATIONS

International Search Report and Written Opinion for PCT/IB2016/053276 dated Aug. 10, 2016.
(Continued)

*Primary Examiner* — Abhishek Sarma
(74) *Attorney, Agent, or Firm* — Norton Rose Fulbright US LLP

(57) ABSTRACT

Electromechanical actuators may be constructed as cylindrical elements with electrodes position around the cylindrical element. The electrodes may receive an electrical signal that causes a core material in the electromechanical actuator to change shape, thus providing haptic feedback to a user, such as when the actuators are integrated with a display screen of a smart phone. A position of the electrodes around the core material may affect a mode of operation of the electromechanical actuators. In one configuration, two (Continued)

electrodes may be located at opposite ends of the cylindrical element along a long axis of the cylinder. In another configuration, two electrodes may be located opposite each other along a circumference of the cylinder. Signals may be applied to the electrodes to generate vibrational feedback or textures on the display screen.

11 Claims, 7 Drawing Sheets

(51) Int. Cl.
    *G06F 3/041*      (2006.01)
    *G06F 3/044*      (2006.01)

(52) U.S. Cl.
    CPC ......... *G09B 21/003* (2013.01); *G09B 21/004* (2013.01); *G06F 2203/04112* (2013.01)

(56) References Cited

U.S. PATENT DOCUMENTS

| | | | |
|---|---|---|---|
| 6,991,759 B2 | 1/2006 | Subramaniam | 264/435 |
| 8,319,403 B2 | 11/2012 | Lipton et al. | 310/339 |
| 8,390,594 B2 | 3/2013 | Modarres et al. | 345/174 |
| 8,431,080 B2 | 4/2013 | Liu et al. | 422/82.02 |
| 8,780,060 B2 | 7/2014 | Maschmeyer et al. | 345/173 |
| 8,785,914 B2 | 7/2014 | Choi et al. | 257/40 |
| 2005/0057528 A1 | 3/2005 | Kleen | 345/173 |
| 2009/0250267 A1 | 10/2009 | Heubel et al. | 178/18.03 |
| 2011/0038625 A1 | 2/2011 | Zellers et al. | 396/133 |
| 2011/0261021 A1 | 10/2011 | Modarres et al. | 345/177 |
| 2012/0249462 A1 | 10/2012 | Flanagan et al. | 345/173 |
| 2012/0313857 A1 | 12/2012 | Senanayake et al. | 345/168 |
| 2014/0035735 A1 | 2/2014 | Zellers et al. | 340/407.2 |
| 2014/0082490 A1 | 3/2014 | Jung et al. | 715/702 |
| 2014/0125608 A1 | 5/2014 | Murata | 345/173 |
| 2014/0139328 A1 | 5/2014 | Zellers et al. | 340/407.2 |

FOREIGN PATENT DOCUMENTS

| | | |
|---|---|---|
| WO | WO 2005086249 | 9/2005 |
| WO | WO 2011022319 | 2/2011 |
| WO | WO 2014081879 | 5/2014 |
| WO | WO 2014107677 | 7/2014 |

OTHER PUBLICATIONS

M. Benali-Khoudja, M. Hafez, J.M. Alexandre, and A. Kheddar "Tactile interfaces: a state-of-the-art survey" *ISR 2004, 35th International Symposium on Robotics*, Mar. 23-26, Paris France.

R.S. Dahiya, G. Metta, and M. Valle. "Tactile Sensing-From Humans to Humanoids" *IEEE Trans. Robotics*, vol. 26 pp. 1-20, 2010.

J. Shklovsky, L. Engel, Y. Sverdlov, Y. Shacham-Diamand, S. Krylov "Nano-imprinting lithography of P(VDF-TrFE-CFE) for flexible freestanding MEMS devices" *Microelectronic Engineering* 100 (2012) 41-46.

L. Engel, S. Krylov, Y. Shacham-Diamand, "Thermoplastic nanoimprint lithography of Electroactive polymer poly(vinylidene fluoride-trifluoroethylene-chlorofluoroethylene) for micro/nanoscale and actuators" *J. Micro/Nanolith. MEMS MOEMS*, vol. 13(3) pp. 033011-1-033011-6, (2014).

Caraveo-Frescas et al., *Scientific Reports* 4, 5243 (2014).

Caraveo-Frescas et al., *ACS Nano* 7.6, 5160-5167 (2013).

Stoyanov et al., *RSC Advances* 7, 2272-2278 (2013).

Koo et al., *IEEE Transactions on Robotics* 24.3, 549-558 (2008).

Chen, *The Optical and Dielectric Applications of Poly(Vinylidene Flouride) Based Electro-Active Polymers*, Pennsylvania State University Doctoral Dissertation, 2008.

Qiu et al., *Journal of Applied Physics* 108, Jan. 11, 2001 (2010).

ELECTROMECHANICAL ACTUATORS FOR HAPTIC FEEDBACK IN ELECTRONIC DEVICES

CROSS-REFERENCE TO RELATED APPLICATIONS

This application is a national phase application under 35 U.S.C. § 371 of International Application No. PCT/IB2016/053276 filed Jun. 3, 2016, which claims the benefit of priority of U.S. Provisional Patent Application No. 62/185,515, filed Jun. 26, 2015. The entire contents of each of the above-referenced disclosures are specifically incorporated herein by reference without disclaimer.

FIELD OF THE DISCLOSURE

The instant disclosure relates to user input and interaction with electronic devices. More specifically, this disclosure relates to processing user input and providing haptic feedback.

BACKGROUND

Electronic devices, particularly consumer electronics, must interact with users of the devices by means for receiving input from the user and means for providing output to the user. Classical forms of input include keyboard and mouse devices, but also include newer touch screen devices. Classical forms of output include digital displays and toggle lights, but also include newer liquid crystal display (LCD) technology.

Another form of output that many electronic devices provide is haptic feedback. For example, many smartphones include a rotating mass motor that vibrates when users touch the screen or to indicate a notification of new email or incoming call. However, this haptic feedback is extremely limited and is not localized to any particular part of the smartphone. Further, the motor is a large physical object that restricts smartphone design and limits the ability of designers to reduce the thickness and other dimensions of the smartphone. Additionally, the motor consumes significant power in comparison to the capability provided by the motor, particularly in comparison to the thin-film semiconductor-based components within the smartphone.

Many of these same electronic devices rely on tactile sensing for receiving input from the user. One conventional tactile sensing technology is illustrated in FIG. 1. FIG. 1 is a conventional smartphone with capacitive touchscreen. A smartphone 100 may include a rotating mass motor 110 for providing the haptic feedback described above. The smartphone 100 may also include a touch screen 120. A portion of the touch screen 120 is blown out to show a profile of the screen 120, which includes a transparent material 122. The transparent material 122 may be laid over sensors 124A-E. The sensors 124A-E may detect user input, such as force applied to the transparent material 122, as changes in capacitance at each of the sensors 124A-E. For example, a user pressing the screen 120 near sensor 124C would cause a change in capacitance 126B, 126C, and 126D in the screen 120 detectable by sensors 124B, 124C, and 124D, respectively. A processor within the smartphone 100 may detect the change in capacitances 126B, 126C, and 126D and correlate them with known x and y locations of the sensors 124B, 124C, and 124D to determine the user input location. The configuration of motor 110 and touch screen 120 separates the user input from the haptic feedback. Further, the haptic feedback is not correlated with the touch screen 120 in that haptic feedback cannot be delivered to particular locations of the touch screen 120.

Other conventional tactile sensing technologies include, for example, resistive or piezoresistive sensors that process input based on a resistance change as a function of the contact location and/or applied force. These resistive sensors consume significant amounts of power. They also can measure only one contact point and cannot detect the amount of force applied. Another conventional tactile sensing technology is a tunnel effect sensor that converts stress into modulated current density by means of the quantum tunneling effect. However they require a charge-couple device (CCD) camera, which is bulky and difficult to integrate into an electronic device. Yet another conventional tactile sensing technology is a capacitive sensor, which detects input based on a change of capacitance in a contact point. This technology provides static detection, but lacks the ability to quantify the amount of force or pressure applied. Yet other conventional tactile sensing technologies include ultrasonic-based sensors, optical sensors, and magnetism-based sensors. However, these sensors are all difficult to integrate into electronic devices because of weight and size issues.

Only some drawbacks to conventional electronic devices and input and output to those devices are described above. However these drawbacks illustrate a need for further improvements in user input and user feedback to improve capability of electronic devices, such as consumer smartphones, to interact with users.

SUMMARY

To better interact with humans, the next generation of electronic devices can use haptic feedback to interact with a human's sense of the touch. Although haptic feedback exists today, it is limited in operation in the conventional haptic feedback systems described above. In embodiments disclosed herein, apparatuses and method for operating the apparatuses may allow providing localized haptic feedback to a user. The localized haptic feedback may provide a better experience and satisfy the eagerness of the end user for new sensations, particularly for augmented reality gaming and interactive interfaces. To provide such a tactile effect, multiple electromechanical actuators with electrodes may be manufactured in a parallel design. With such an architecture, designs may be produced for different form factors of the actuators, positions of the electrodes, and the kind of the electrodes. Such flexibility may allow configurations to achieve either a vibrational mode, a static deflection mode, or a combination of both. Additionally, the apparatuses and methods for operating the apparatuses may also allow for receiving input through the electromechanical actuators or through a capacitive touch screen or other input device operating along with the electromechanical actuators. For example, a sensing circuit coupled to the electrode may allow sensing a force or pressure applied in the proximity of the electrode and to determine a position of a user's finger in combination with providing the haptic feedback.

In one embodiment, the electromechanical actuators may be integrated with an electronic device as part of a display screen. The electrodes may be configured in a vertical orientation with electrodes on a top and bottom of the actuator. In the vertical orientation, a direct current (DC) stimulus may be applied to the electrodes to generate static displacement, such that a height or another aspect of the electromechanical actuators changes. An alternating current (AC) stimulus may also or alternatively be applied to the electrodes to generate vibrational feedback separate from or in addition to the static deflection. The electrodes may also be configured in a circular orientation, such as with electrodes along a circumference of the electrode. In the circular orientation, an alternating current (AC) stimulus may be applied to the electrodes to generate vibrational feedback. A direct current (DC) stimulus may also or alternatively be applied in the electrodes to generate static deflection separate from or in addition to the vibrational feedback. Either configuration, the vertical or circular orientation, may be easily integrated on a touchscreen surface to enhance a user's tactile experience.

According to one embodiment, an apparatus may include a display device and an array of transparent electromechanical actuators on the display device. Each transparent electromechanical actuator of the array of transparent electromechanical actuators may include a cylindrical electromechanical material core, a first electrode attached to the cylindrical electromechanical material core, and/or a second electrode attached to the cylindrical electromechanical material core, wherein the first electrode and the second electrode are attached to the cylindrical electromechanical material core on opposite ends of the cylindrical electromechanical material core. The apparatus may further include a haptic feedback control circuit coupled to the first electrode and the second electrode, wherein the haptic feedback control circuit is configured to provide a direct current (DC) signal to apply haptic feedback through the array of transparent electromechanical actuators, wherein the haptic feedback control signal is configured to cause a plurality of transparent electromechanical sensors to simulate a texture on the display device. In one embodiment, the cylindrical electromechanical material core comprises a piezoelectric PVDF-TrFE-CFE polymer.

According to another embodiment, an apparatus may include a display device and an array of transparent electromechanical actuators on the display device. Each transparent electromechanical actuator of the array of transparent electromechanical actuators may include a cylindrical electromechanical material core, a first electrode attached to the cylindrical electromechanical material core, and/or a second electrode attached to the cylindrical electromechanical material core, wherein the first electrode, the second electrode, and the cylindrical electromechanical material core are stacked vertically along a direction of light emitted from the display device. The apparatus may also include a haptic feedback control circuit coupled to the first electrode and the second electrode, wherein the haptic feedback control circuit is configured to provide an alternating current (AC) signal to apply haptic feedback through the array of transparent electromechanical actuators. In one embodiment, the cylindrical electromechanical material core comprises a piezoelectric PVDF-TrFE-CFE polymer.

According to a further embodiment, a transparent electromechanical actuator may include a cylindrical piezoelectric core, a first electrode attached to the piezoelectric core, and/or a second electrode separate from the first electrode and attached to the piezoelectric core. The piezoelectric core, the first electrode, and the second electrode may be transparent. The transparent electromechanical actuator may be configured to receive a direct current (DC) signal at the first electrode and the second electrode and configured to generate haptic feedback based on the DC signal.

According to another embodiment, a transparent electromechanical actuator may include a cylindrical piezoelectric core, a first electrode attached to the piezoelectric core, and/or a second electrode separate from the first electrode, attached to the piezoelectric core. The piezoelectric core, the first electrode, and the second electrode may be transparent. The piezoelectric core may comprise a cylinder, and the first electrode and the second electrode may be oriented around a circumference of the cylinder.

According to a further embodiment, a method of manufacturing an array of electromechanical actuators may include depositing the piezoelectric core material on a transparent substrate, depositing a transparent conductive material on the piezoelectric core material, and/or patterning at least the piezoelectric core material to form the cylindrical piezoelectric core for the array of transparent electromechanical actuators. The step of patterning at least the piezoelectric core material comprises patterning at least the piezoelectric core material and the transparent conductive material. In some embodiments, the method of manufacturing may also include annealing the piezoelectric core material after depositing the piezoelectric core material, applying an electric field to the piezoelectric core material during at least a portion of the annealing of the piezoelectric core material, patterning at least the piezoelectric core material by performing thermoplastic nano/micro imprint lithography (T-NIL), depositing the piezoelectric core material by performing chemical vapor deposition (CVD), depositing the piezoelectric core material by performing spin coating, and/or depositing a second transparent conductive material before depositing the piezoelectric core material wherein the step of patterning at least the piezoelectric core material comprises patterning at least the piezoelectric core material and the second transparent conductive material.

According to another embodiment, an array of electromechanical actuators may be operated according to a method including receiving a control signal from a processor indicating a type of haptic feedback to provide to a user, generating a feedback signal according to the indicated type of haptic feedback, and/or applying the feedback signal to the first electrode and the second electrode to induce the indicated type of haptic feedback in the piezoelectric core.

According to a further embodiment, an electronic device may include a display device with an integrated array of electromechanical actuators, a memory, and a processor. The processor may be coupled to the memory, coupled to the display device, and coupled to the array of transparent electromechanical actuators. The electronic device may be, for example, a mobile device, a tablet computer, a personal computer, a laptop computer, a mobile phone, a smart phone, a medical device, a media player, and a navigational assistance device.

In the context of the present invention, twenty (20) embodiments are described. Embodiment 1 includes an apparatus. The apparatus can include a display device; an array of transparent electromechanical actuators on the display device, wherein each transparent electromechanical actuator of the array of transparent electromechanical actuators includes: a cylindrical electromechanical material core; a first electrode attached to the cylindrical electromechanical material core; and a second electrode attached to the cylindrical electromechanical material core, wherein the first electrode, the second electrode, and the cylindrical electromechanical material core are stacked vertically along a direction of light emitted from the display device; and a haptic feedback control circuit coupled to the first electrode and the second electrode, wherein the haptic feedback control circuit is configured to provide a direct current (DC) signal to apply haptic feedback through the array of transparent electromechanical actuators, wherein the haptic feedback control signal is configured to cause a plurality of transparent electromechanical sensors to simulate a texture on the display device. Embodiment 2 is the apparatus of embodiment 1, wherein the cylindrical electromechanical material core includes a piezoelectric PVDF-TrFE-CFE polymer. Embodiment 3 is the apparatus of any one of embodiments 1 or 2, wherein the haptic feedback circuit is configured to generate a direct current (DC) signal to cause the cylindrical electromechanical material core to expand to cause static deflection to create the simulated texture. Embodiment 4 is the method of embodiment 3, wherein the haptic feedback control circuit is configured to control a static deflection amount of the cylindrical electromechanical material core based, at least in part, on an applied current through the first electrode and the second electrode. Embodiment 5 is the apparatus of embodiment 1, wherein the haptic feedback control circuit is further configured to provide an alternating current (AC) signal to apply vibrational feedback as part of the haptic feedback. Embodiment 6 is the apparatus of any one of embodiments 1 to 5, further including an input sensing circuit coupled to the first electrode and the second electrode, wherein the input sensing circuit is configured to measure at least one of force and pressure applied to the transparent electromechanical actuators and generate a signal indicative of a user's input on the display device. Embodiment 7 is the apparatus of any one of embodiments 1 to 6, wherein the display device includes a capacitive sensing layer, and the apparatus further includes an input sensing circuit coupled to the capacitive sensing layer and configured to generate a signal indicative of a user's input on the display device based, at least in part, on a measured capacitance of the capacitive sensing layer.

Embodiment 8 includes an apparatus. The apparatus can include a display device; an array of transparent electromechanical actuators on the display device, wherein each transparent electromechanical actuator of the array of transparent electromechanical actuators comprises: a cylindrical electromechanical material core; a first electrode attached to the cylindrical electromechanical material core; and a second electrode attached to the cylindrical electromechanical material core, wherein the first electrode and the second electrode are oriented around a circumference of the cylindrical electromechanical material core; and a haptic feedback control circuit coupled to the first electrode and the second electrode, wherein the haptic feedback control circuit is configured to provide an alternating current (AC) signal to apply haptic feedback through the array of transparent electromechanical actuators. Embodiment 9 is the apparatus of embodiment 8, wherein the cylindrical electromechanical material core includes a piezoelectric PVDF-TrFE-CFE polymer. Embodiment 10 is the apparatus of any one of embodiments 8 to 9, wherein the haptic feedback control circuit is further configured to provide a direct current (DC) signal to apply haptic feedback through the array of transparent electromechanical actuators, wherein the haptic feedback control signal is configured to cause a plurality of transparent electromechanical sensors to simulate a texture on the display device. Embodiment 11 is the apparatus of any one of embodiments 8 to 10, further including an input sensing circuit coupled to the first electrode and the second electrode, wherein the input sensing circuit is configured to measure at least one of force and pressure applied to the transparent electromechanical actuators and generate a signal indicative of a user's input on the display device. Embodiment 12 is the apparatus of any one of embodiments 8 to 11, wherein the display device comprises a capacitive sensing layer, and the apparatus further comprises an input sensing circuit coupled to the capacitive sensing layer and configured to generate a signal indicative of a user's input on the display device based, at least in part, on a measured capacitance of the capacitive sensing layer. Embodiment 13 is the apparatus of claim 8, wherein the haptic feedback control circuit is configured to provide vibrational feedback through the array of transparent electromechanical actuators. Embodiment 14 is the apparatus of embodiment 13, wherein the haptic feedback control circuit is configured to adjust the vibrational feedback through at least one of an amplitude and a frequency of the alternating current (AC) signal.

Embodiment 15 includes a transparent electromechanical actuator. The transparent electromechanical actuator can include a cylindrical piezoelectric core; a first electrode attached to the piezoelectric core; and a second electrode, separate from the first electrode, attached to the piezoelectric core, wherein the piezoelectric core, the first electrode, and the second electrode are transparent, wherein the transparent electromechanical actuator is configured to receive a direct current (DC) signal at the first electrode and the second electrode and configured to generate haptic feedback based on the DC signal, wherein the DC signal is configured to cause the transparent electromechanical actuator to simulate a texture. Embodiment 16 is the transparent electromechanical actuator of embodiment 15, wherein the piezoelectric core includes a cylinder, and wherein the first electrode, the piezoelectric core, and the second electrode are stacked approximately along a long axis of the cylinder with the first electrode and the second electrode attached to opposing faces of the cylinder. Embodiment 17 is the transparent electromechanical actuator of embodiment 15, further including a haptic feedback control circuit configured to generate the DC signal. Embodiment 18 is the transparent electromechanical actuator of any one of embodiments 15 to 17, wherein the DC signal is configured to generate a button through haptic feedback.

Embodiment 19 includes a transparent electromechanical actuator. The transparent electromechanical actuator can include a cylindrical piezoelectric core; a first electrode attached to the piezoelectric core; and a second electrode, separate from the first electrode, attached to the piezoelectric core, wherein the piezoelectric core, the first electrode, and the second electrode are transparent, wherein the first electrode and the second electrode are oriented around a circumference of the cylinder, wherein the transparent electromechanical actuator is configured to receive an alternating current (AC) signal at the first electrode and the second electrode and configured to generate haptic feedback based on the AC signal. Embodiment 20 is the transparent electromechanical actuator of embodiment 19, further including a haptic feedback control circuit configured to generate the AC signal.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying FIGS. It is to be expressly understood, however, that each of the FIGS. is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
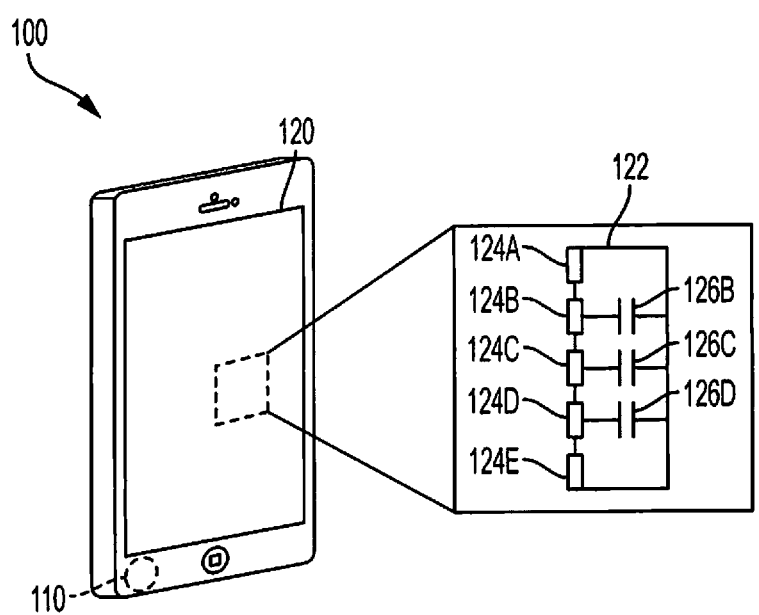
FIG. 1 is a conventional smartphone with capacitive touchscreen.
Figure 2:
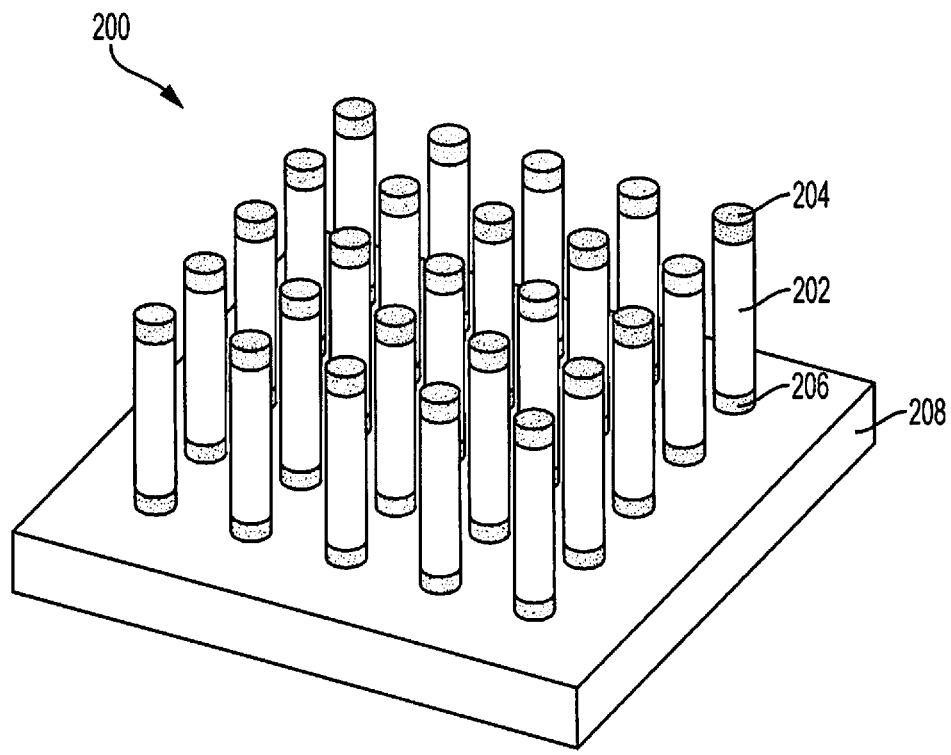
FIG. 2 is an illustration showing an array of cylindrical electromechanical actuators with electrodes oriented along a long axis according to one embodiment of the disclosure.

Electromechanical actuators may be constructed as cylindrical elements with electrodes position around the cylindrical element. The electrodes can receive an electrical signal that causes a core material in the electromechanical actuator to change shape, thus providing haptic feedback to a user. A position of the electrodes around the core material may affect a mode of operation of the electromechanical actuators. In one configuration, two electrodes may be located at opposite ends of the cylindrical element along a long axis of the cylinder. FIG. 2 is an illustration showing an array of cylindrical electromechanical actuators with electrodes oriented along a long axis according to one embodiment of the disclosure. An array of electromechanical actuators 200 may include one or more actuators. In the embodiment shown in FIG. 2, the array 200 is shown as cylindrical electromechanical actuators organized in an x-y grid with equal spacing between the actuators. However, different layouts are possible, such as where one row of the x-y grid is offset from a previous row. The array 200 may be located on a substrate 208. The substrate 208 may be, for example, glass, polycarbonate, PMMA, PET, PEN, Polyimide, and/or any other transparent polymer or transparent inorganic substrate.

Each actuator of the array 200 may include a cylindrical electromechanical material core 202. The material core 202 may be a piezoelectric material or another electroactive or electromechanical material. For example, the material core 202 may be PVDF, a PVDF copolymer (e.g., PVDF-TrFE, PVDF-TrFE-CFE), Parylene, PDMS, Polypropylene, void charge polymers, electroactive polymers such as acrylates and elastomers, and/or transparent nanocomposites, such as ZnO in a SU-8 matrix. Each actuator may have a long axis oriented approximately perpendicular to a surface vector of the substrate 208. Thus, the actuator may extend vertically from the substrate 208, such as toward a user when the substrate 208 is part of a display of an electronic device. Electrodes 204 and 206 may be located on opposite ends of the long axis. Electrodes 204 and 206 may be conductive materials such as, for example, a transparent conductive polymer such as PEDOT:PSS, transparent conductive oxides such as ITO, AZO, F:SnO2 and zinc-based oxides, graphene and graphene-like materials, metal-based nanowires and/or nanoparticles such as silver nanowires and copper nanowires, carbon nanotubes and other carbon-based structures, a metal mesh, and/or a nanomesh.

A stimulus, such as a voltage, may be applied across the electrodes 204 and 206 to create an electric field through the material core 202. When the material core 202 is a piezoelectric material, the electric field extending between the electrodes 204 and 206 may cause the material core 202 to change shape. For example, an applied stimulus may be used to control a length of the material core 202 along the long axis. Thus, a height (or length) of an actuator may be adjusted and controlled by applying appropriate stimuli to the actuators. Each actuator of the array 200 may be individually controlled through appropriate circuitry to apply different stimuli to different actuators to create a texture that a user can feel. That texture may be created, for example, overlying a display screen such that a person can feel a button or feel the texture of an animal's skin in a photograph. In one embodiment, static deflection of the actuators may be caused by applying a direct current (DC) signal as a stimulus for the actuators. Static deflection of the actuators is further described with reference to FIG. 3.

Figure 3:
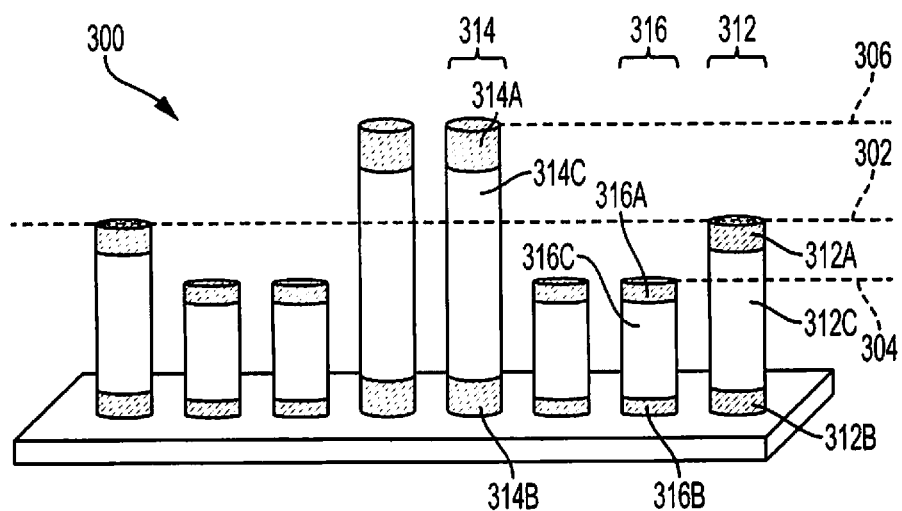
FIG. 3 is an illustration showing an array of cylindrical electromechanical actuators receiving a direct current (DC) stimulation to cause static displacement of the electromechanical actuators according to one embodiment of the disclosure.

FIG. 3 is an illustration showing an array of cylindrical electromechanical actuators receiving a direct current (DC) stimulation to cause static displacement of the electromechanical actuators according to one embodiment of the disclosure. An array 300 of actuators is shown with some of the actuators affected by an applied DC stimulus. An actuator 312 may include material core 312C and electrodes 312A-B. No stimulus is applied to actuator 312, thus actuator 312 has a height reaching level 302, which is a rest height for actuators of the array 300. A positive DC signal may be applied to actuator 314 across electrodes 314A-B to cause the core material 314C to expand along its long axis. The actuator 314 thus reaches height level 306 above rest level 302. A negative DC signal may be applied to actuator 316 across electrodes 316A-B to cause the core material 316C to contract along its long axis. The actuator 316 thus reaches height level 304 below rest level 302. Although a positive signal is described as stretching an actuator and a negative signal is described as shrinking an actuator, the positive and negative signals are relative and may be switched. Thus, alternatively, a negative DC signal may shrink an actuator and a positive signal may stretch an actuator. By individually controlling actuators 312, 314, and 316 (and other actuators not shown) of the array 300, a texture may be generated at a surface of an electronic device, such as a smart phone or mobile computer.

Figure 4:
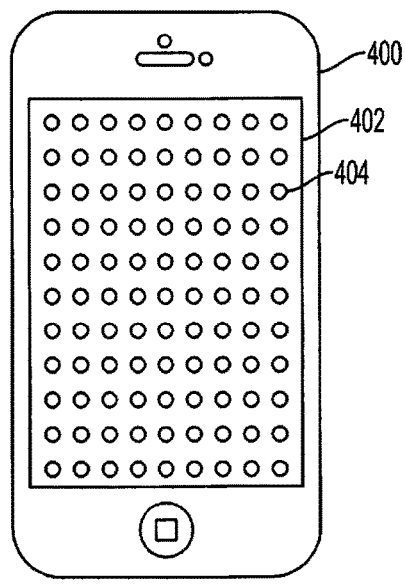
FIG. 4 is an illustration showing an array of cylindrical electromechanical actuators integrated into a display of an electronic device according to one embodiment of the disclosure.

A smart phone with a display screen integrating an array of actuators, such as the array shown in FIG. 2 and FIG. 3, is shown in FIG. 4. FIG. 4 is an illustration showing an array of cylindrical electromechanical actuators integrated into a display of an electronic device according to one embodiment of the disclosure. A smart phone 400 may include a display device 402. An array 404 of electromechanical actuators may be integrated with the display device 402 to provide a user with addressable and localized haptic feedback. In one embodiment, the array 404 may be constructed of transparent materials and integrated over the display device 402. Although a smart phone is illustrated in FIG. 4, the array 404 may also be integrated into any display device of any electronic device in the same manner. For example, the array 404 of electromechanical actuators may be integrated into a smart watch, a tablet computer, a laptop computer, a cellular phone, a remote control, or a television screen. Further, the array 404 of electromechanical actuators may be integrated into other components separate from a display device. For example, the electromechanical actuators may be integrated into a tablet without a display device, and the array may be used to generate braille letters on a surface of the tablet for reading by the visually-impaired.

Figure 5:
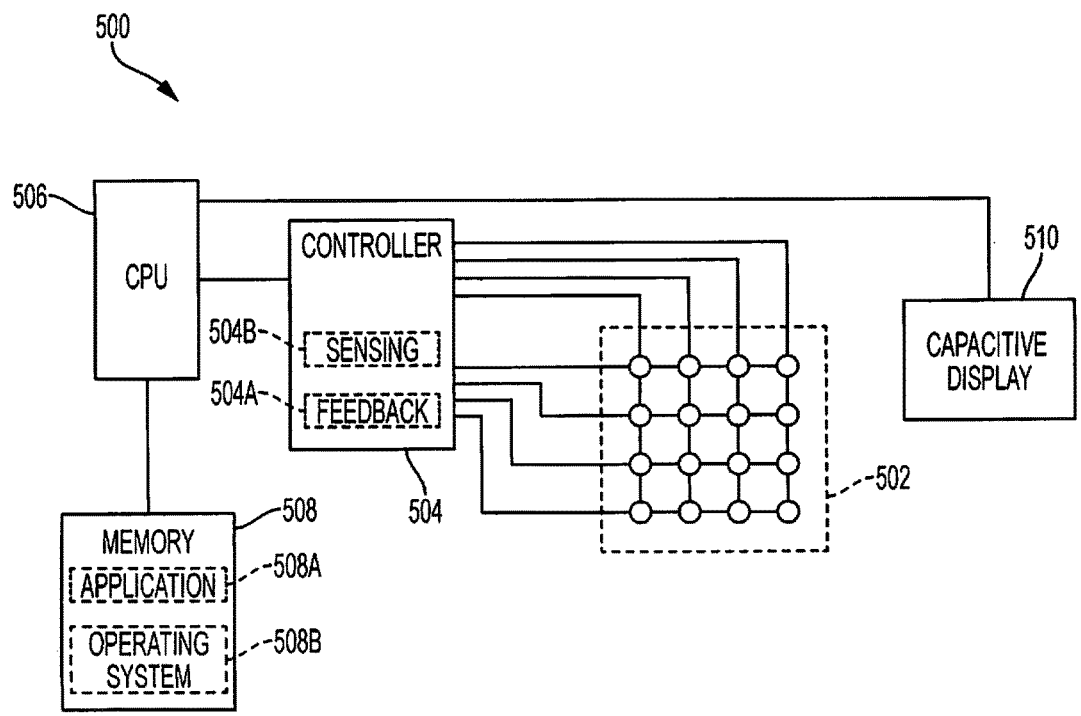
FIG. 5 is a block diagram showing operation of an array of cylindrical electromechanical actuators from a controller according to one embodiment of the disclosure.

Control of an array of electromechanical actuators to create textures through electrostatic deflection may be performed from a controller coupled to the array as shown in FIG. 5. FIG. 5 is a block diagram showing operation of an array of cylindrical electromechanical actuators from a controller according to one embodiment of the disclosure. A system 500 may include an array 502 of electromechanical actuators, such as the arrays described above with reference to FIG. 2 and FIG. 3. The array 502 may be coupled to a controller 504, which may be configured to apply stimulus to the actuators of array 502. The controller 504 may be configured to individually address actuators of the array 502, such that the controller 504 can manipulate a height of individual actuators within the array 502. The controller 504 may also be configured to address actuators of the array 502 by groups of, for example, 4 or 16 actuators at a time. In one embodiment, the array 502 may be configured similar to a dynamic random access memory (DRAM) module with word and bit lines arranged to allow addressing one or more actuators of the array 502.

The controller 504 may generate control signals for providing haptic feedback through the array 502 and/or receiving sensing signals for determining user input through the array 502. The controller 504 may coordinate operation of the array 502 with a processor 506 and memory 508. In one configuration, the processor 506 may execute an application 508A or an operating system 508B residing within the memory 508. Application code within the application 508A may include code for providing haptic feedback to a user, such code may apply a texture to a displayed image. The operating system 508B executing on the processor 506 may cause the execution of the application 508A including code to provide the haptic feedback. In another configuration, the operating system 508B may include code to provide haptic feedback as part of an application programming interface (API) accessed by the application 508A. Thus, for example, when the application 508A generates a user dialog box with buttons, the operating system 508B may include code to automatically apply haptic feedback to that user dialog box.

Figure 6:
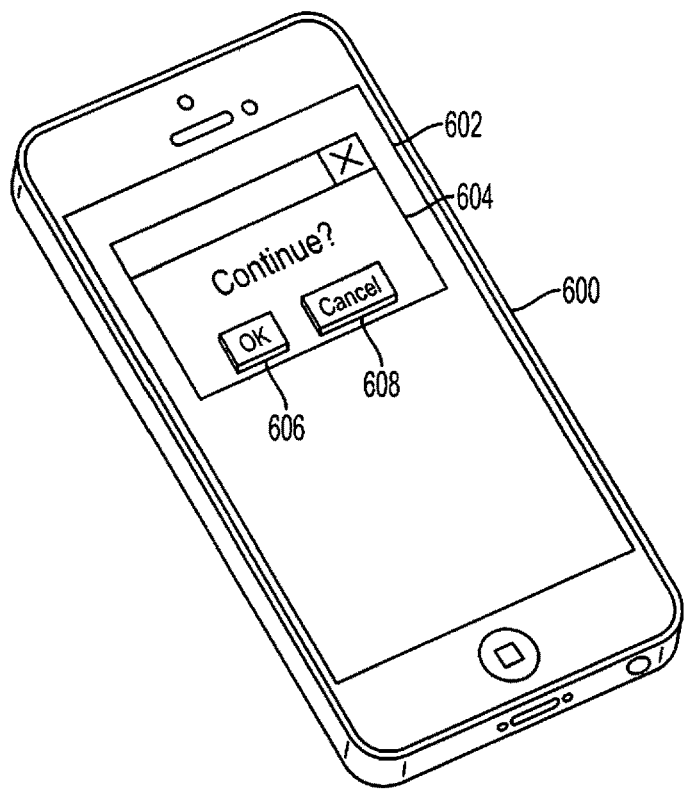
FIG. 6 is an illustration showing a texture presented on a display of an electronic device using an array of cylindrical electromechanical actuators receiving a direct current (DC) stimulation according to one embodiment of the disclosure.

An example of the textures produced through static deflection of the array 502 is illustrated in FIG. 6. FIG. 6 is an illustration showing a texture presented on a display of an electronic device using an array of cylindrical electromechanical actuators receiving a direct current (DC) stimulation according to one embodiment of the disclosure. A mobile phone 600 may include a display device 602. During operation of the mobile phone 600, an application executing on the mobile phone 600 may display a dialog box with an "OK" or "Cancel" selection indicated by buttons 606 and 608, respectively. The electromechanical actuators located at the position of the buttons 606 and 608 may be stimulated to generate a texture of a raised surface at the location of the buttons 606 and 608. The texture may provide sensation to a user operating the smart phone 600 and allow them to quickly find the buttons 606 and 608. Further, the actuators may be programmed to provide a user with haptic feedback in response to pressing the buttons 606 and 608, such as by depressing the texture of the button 606 or 608 depending on which button was pressed.

Referring back to FIG. 5, the processor 506 may provide haptic feedback by accessing feedback module 504A within the controller 504. The feedback module 504A may receive instructions from the processor 506, in which the instructions include a type of haptic feedback, a strength of the haptic feedback, and/or a location for the haptic feedback. The controller 504 may decode the instruction and provide appropriate stimuli to the array 502 of electromechanical actuators by applying a DC voltage to the identified actuator in the array 500. The DC voltage may be generated by the controller 504 or the controller 504 may connect the actuator to an external voltage source (not shown).

The processor 506 may also interact with the controller 504 to receive input from a user through a sensing module 504B within the controller 504. The sensing module 504B may monitor actuators in the array 502 for changes in characteristics of the actuators that may result from a user applying pressure to the array 502 and causing the actuators to deflect, compress, or otherwise change shape. The change in shape of the actuator may cause, for example, a resistance of the actuator to change. That change in resistance may be detected by the sensing module 504B to determine when and where pressure was applied in the array 502. The sensing module 504B may then communicate to the processor 506 a signal indicating a location of the user's input and an amount of pressure applied by the user. The processor 506 may then provide the user input to the application 508A and/or the operating system 508B executing on the processor 506, which may take action in response to the user input.

In one embodiment, user input may be received through a capacitive layer 510 in the display device in addition to or in alternative to input from the electromechanical actuators. The capacitive layer 510 may be coupled to the processor 506, or through a display controller (not shown), to provide the user input to the application 508A and/or the operating system 508B. The processor 506 may generate instructions for providing haptic feedback in response to user input received from the capacitive layer 510. In other embodiments, no capacitive layer 510 may be present and all user input may be received through the array 502.

Figure 7:
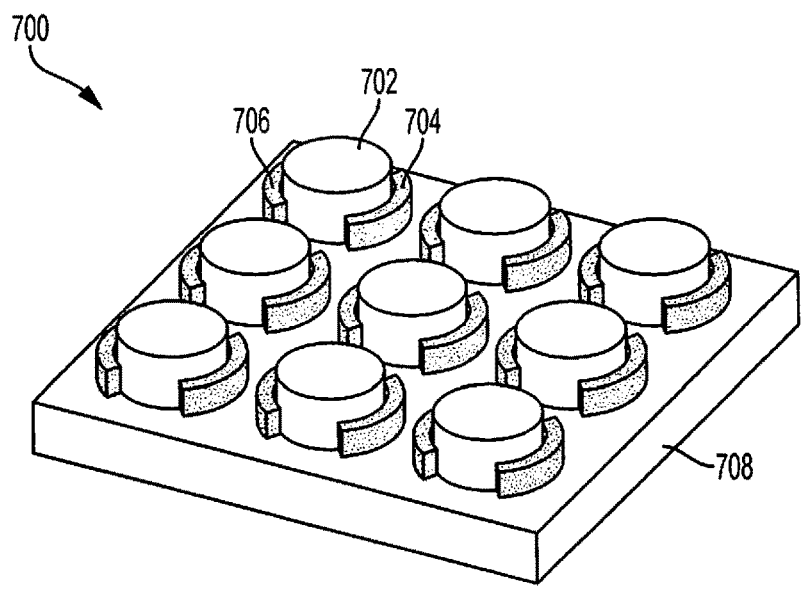
FIG. 7 is an illustration showing an array of cylindrical electromechanical actuators with electrodes oriented along a circumference according to one embodiment of the disclosure.

The configuration of electromechanical actuators described above included cylindrical elements with electrodes positioned around the cylindrical element. In another configuration, the two electrodes may be located at approximately opposite ends of the cylindrical element along a circumference of the cylinder. FIG. 7 is an illustration showing an array of cylindrical electromechanical actuators with electrodes oriented along a circumference according to one embodiment of the disclosure. An array 700 of electromechanical actuators may include a cylindrical material core 702 with electrodes 704 and 706 positioned around the circumference of the cylindrical material core 702. In one embodiment, the electrodes 704 and 706 may be positioned at approximately opposite ends of a diameter through the cylindrical material core 702. The array 700 may be constructed on substrate 708. The materials comprising the material core 702, electrodes 704 and 706, and substrate 708 may be comprised of the same materials described above with reference to the embodiment of FIG. 2.

Figure 8:
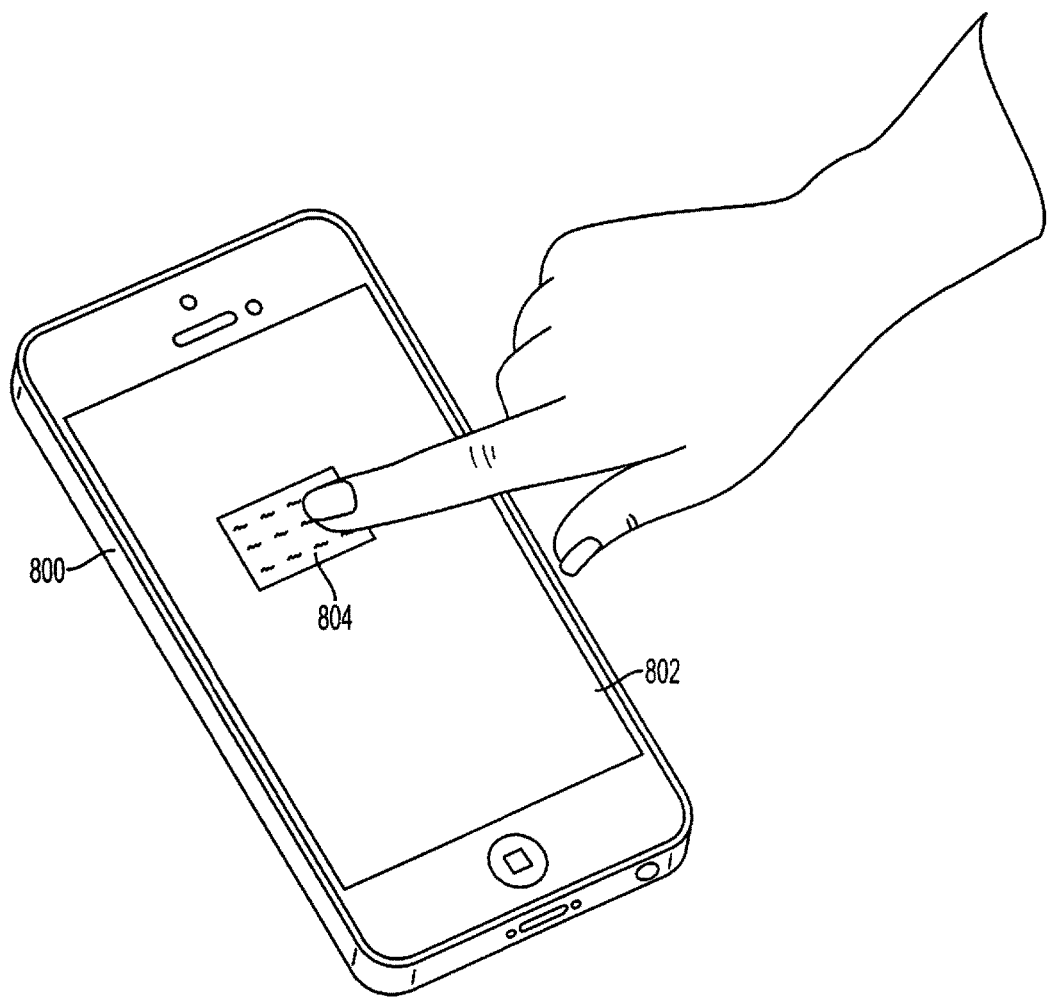
FIG. 8 is an illustration showing a localized vibrational feedback created on a display of an electronic device using an array of cylindrical electromechanical actuators receiving an alternating current (AC) stimulation according to one embodiment of the disclosure.

An alternating current (AC) stimulus may be provided to an actuator with the electrodes 704 and 706 positioned around a circumference of the cylindrical material core 702 as shown in FIG. 7 to generate a vibrational haptic feedback. For example, a vibration sensation may be generated as haptic feedback to a localized portion of a display screen as shown in FIG. 8. FIG. 8 is an illustration showing a localized vibrational feedback created on a display of an electronic device using an array of cylindrical electromechanical actuators receiving an alternating current (AC) stimulation according to one embodiment of the disclosure. A smart phone 800 may include a display device 802 with an integrated array of electromechanical actuators such as the array 700 shown in FIG. 7. The actuators of the array may include addressable actuators or groups of actuators. One or more actuators and/or groups of actuators may be stimulated with alternating current (AC) signal to generate a localized vibrational haptic feedback 804. A user with a finger in the proximity of the haptic feedback 804 may sense the vibration. In one example, the user may have recently pressed a button at a location on the display screen 802 and the haptic feedback 804 may confirm with the user that they selected that button by vibrating the portion of the screen containing the button.

An array of electromechanical actuators as shown in FIG. 7 may be controlled with a system similar to that previously described with reference to FIG. 5. For example, the controller 504 of FIG. 5 may be configured to apply an AC stimulus to the array 502, which would contain the electromechanical actuators configured as illustrated in FIG. 7. The controller 504 may include circuitry for generating appropriate AC stimuli or may include switches that couple the array 502 to an external AC voltage source (not shown). In particular, the controller 504 may include circuitry for controlling an amplitude and/or a frequency of the AC stimuli to create different effects with haptic feedback provided through the array 502. For example, more vigorous haptic feedback may be generated by applying AC stimuli with a high frequency and high amplitude, whereas less vigorous haptic feedback may be generated by applying AC stimuli with a middle range frequency and low amplitude.

Although the configurations of electromechanical actuators shown in FIG. 2 and FIG. 7 are described separately, electromechanical actuators of several different configurations may be incorporated into a single array for integration with a display device. For example, a smart phone may include an integrated array of electromechanical actuators with some actuators having electrodes positioned around the circumference as shown in FIG. 7 and other actuators having electrodes positioned on opposite ends of a long axis as shown in FIG. 2. A controller, such as the controller 504 of FIG. 5, may be configured to control both types of actuators using AC and/or DC stimuli to generate haptic feedback. The controller 504 may execute a method such as that shown in the flow chart of FIG. 9.

Further, although the electromechanical actuators shown in FIG. 2 are described with respect to DC stimuli and the electromechanical actuators in FIG. 7 are described with respect to AC stimuli, the electromechanical actuators of either FIG. 2 or FIG. 7 may receive DC or AC stimuli. For example, the controller 504 of FIG. 5 may be configured to apply DC stimuli as described with respect to FIG. 2, FIG. 3, FIG. 4, FIG. 5, and FIG. 6 may apply DC stimuli to the electromechanical actuators of FIG. 7. As another example, the controller 504 of FIG. 5 may be configured to apply AC stimuli as described with respect to FIG. 7 to the electromechanical actuators of FIG. 2. The AC and DC stimuli may be alternatively applied to either the electromechanical actuators of FIG. 2 or of FIG. 7. Additionally, the AC and DC stimuli may be applied simultaneously to either the electromechanical actuators of FIG. 2 or of FIG. 7 to create a textured surface with vibrational feedback.

Figure 9:
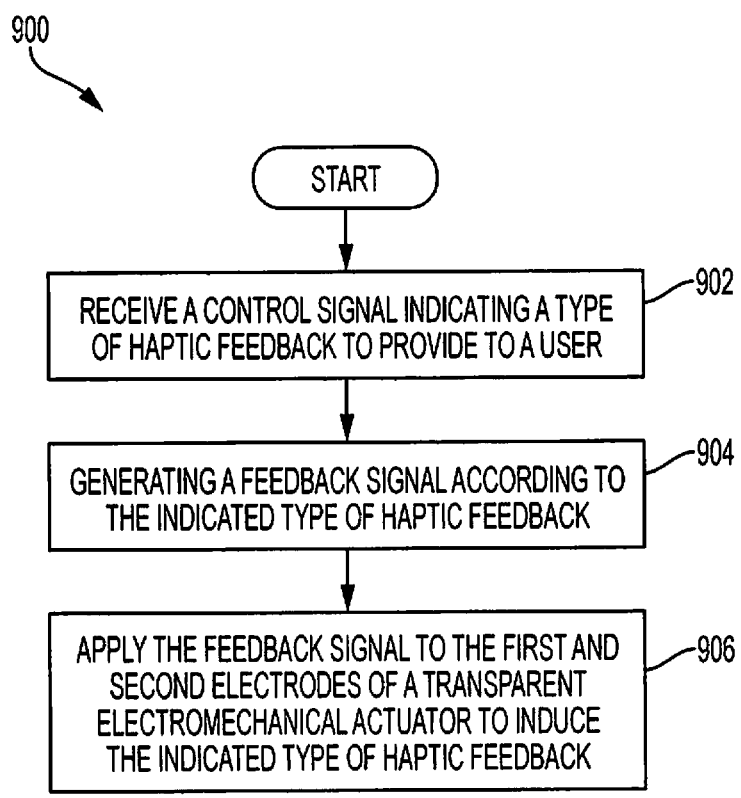
FIG. 9 is a flow chart illustrating a method of generating haptic feedback in an electronic device with an array of cylindrical electromechanical actuators according to one embodiment of the disclosure.

FIG. 9 is a flow chart illustrating a method of generating haptic feedback in an electronic device with an array of cylindrical electromechanical actuators according to one embodiment of the disclosure. A method 900 may begin at block 902 with receiving a control signal indicating a type of haptic feedback to provide to a user. For example, the processor 506 may generate a control signal that is received by the controller 504. The control signal may indicate either vibrational sensation or application of a texture for the desired type haptic feedback. Then, at block 904, the controller 504 may generate a feedback signal according to the indicated type of haptic feedback. For example, when the controller 504 is instructed to generate vibrational sensation, the controller 504 may generate or obtain an alternating current (AC) stimuli. In another example, when the controller 504 is instructed to apply a texture to a display screen, the controller 504 may generate or obtain a direct current (DC) stimuli. Then, at block 906, the controller 504 may apply the feedback signal to first and second electrodes of a transparent electromechanical actuator to induce the indicated type of haptic feedback. The application of the generated feedback signal may include addressing an individual or a group of actuators within the array. The addressed actuators may be selected based on an indication of a desired position on the display screen for the haptic feedback received from the processor 506.

Figure 10:
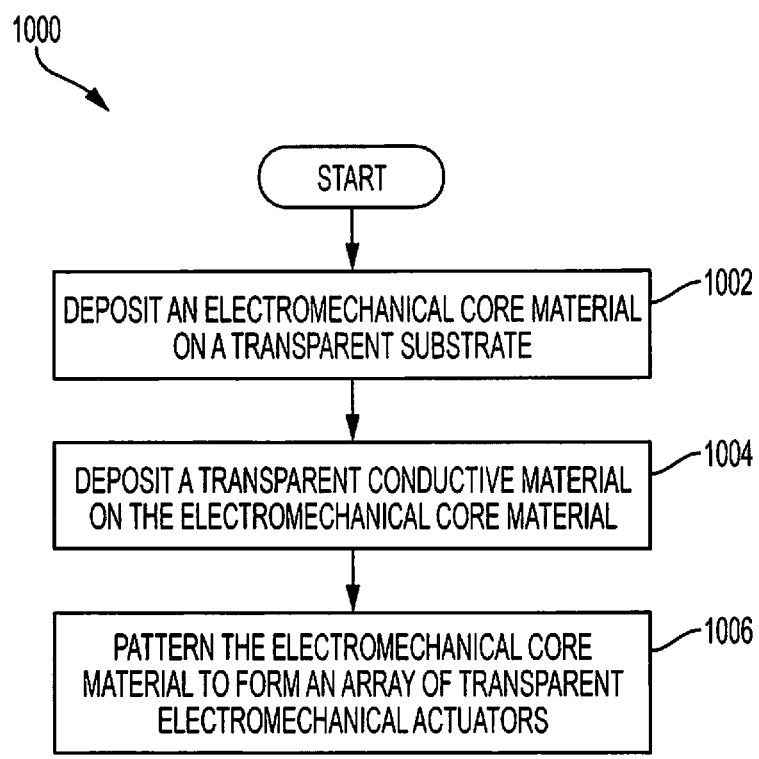
FIG. 10 is a flow chart illustrating a method of manufacturing an array of cylindrical electromechanical actuators according to one embodiment of the disclosure.

An array of electromechanical actuators, such as those illustrated in FIG. 2 and FIG. 7 or a combination thereof, may be manufactured using novel combinations of semiconductor manufacturing techniques. FIG. 10 is a flow chart illustrating a method of manufacturing an array of cylindrical electromechanical actuators according to one embodiment of the disclosure. A method 1000 may begin at block 1002 with depositing an electromechanical core material on a transparent substrate. When electromechanical actuators such as those in FIG. 2 are manufactured, a transparent conductive material may be deposited before block 1002. Then, at block 1004, a transparent conductive material may be deposited on the electromechanical core material. Next, at block 1006, the electromechanical core material may be patterned to form an array of transparent electromechanical actuators. Simultaneously with, or in separate processing steps, the transparent conductive material may also be patterned to form first and second electrodes in contact with the electromechanical core material.

In certain embodiments of the array of electromechanical actuators, the fabrication of the active film on the top of the display can be done using either a physical/chemical lithographic process or thermoplastic nano/micro imprint lithography (T-NIL), or a combination of both. With physical/chemical lithography, three or more steps may include starting with the deposition of the active film. Depending on the nature of the active material, such as whether it is a solid or in a solution, CVD deposition or spin coating may be employed. After the deposition, nanofabrication techniques, such as plasma, UV, and/or chemical, may be applied to design a desired architecture. In some embodiments, the actuators may be activated to improve piezoelectric properties of the electromechanical material core. For example, a high electrical field may be applied to the array of electromechanical actuators concurrently with heating the array to improve piezoelectric properties. With thermoplastic nano/micro imprint lithography (T-NIL), a mold may be stamped into a polymer by mechanical deformation while heating the polymer. T-NIL may offer lower cost processing and improved crystallinity of the polymer, which may result in better piezoelectric properties of the electromechanical actuator material core.

Electromechanical actuator arrays described above may be advantageously employed in electronic devices, such as by integrating the arrays with display devices. In some embodiments, a fully transparent localized haptic feedback device may be integrated on top of touch screens using the array of electromechanical actuators. Further, actuation and sensing may be possible with micron to millimeter scale resolution, depending on the number of actuators in an array and spacing between the actuators. In some embodiments, incorporation of sensing circuitry may allow sensing user input by detecting variations in resistivity across the array.

If implemented in firmware and/or software, the functions described above, such as with respect to the flow chart of FIG. 9 may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically erasable programmable read-only memory (EEPROM), compact-disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. An apparatus, comprising:
a display device;
an array of transparent electromechanical actuators on the display device, wherein each transparent electromechanical actuator of the array of transparent electromechanical actuators comprises:
an electromechanical material core;
a first electrode attached to the electromechanical material core; and
a second electrode attached to the cylindrical electromechanical material core, wherein the first electrode, the second electrode, and the electromechanical material core are stacked vertically along a direction of light emitted from the display device; and
a haptic feedback control circuit coupled to the first electrode and the second electrode, wherein the haptic feedback control circuit is configured to provide a direct current signal to apply haptic feedback through the array of transparent electromechanical actuators,
wherein the haptic feedback control signal is configured to cause a plurality of transparent electromechanical sensors to simulate a texture on the display device; and
wherein the electromechanical material core is cylindrical.

2. The apparatus of claim 1, wherein the cylindrical electromechanical material core comprises a piezoelectric PVDF-TrFE-CFE polymer.

3. The apparatus of claim 1, wherein the haptic feedback circuit is configured to generate a direct current signal to cause the cylindrical electromechanical material core to expand to cause static deflection to create the simulated texture.

4. The method of claim 3, wherein the haptic feedback control circuit is configured to control a static deflection amount of the cylindrical electromechanical material core based, at least in part, on an applied current through the first electrode and the second electrode.

5. The apparatus of claim 1, wherein the haptic feedback control circuit is further configured to provide an alternating current signal to apply vibrational feedback as part of the haptic feedback.

6. The apparatus of claim 1, wherein the apparatus further comprises an input sensing circuit coupled to the first electrode and the second electrode, wherein the input sensing circuit is configured to measure at least one of force and pressure applied to the transparent electromechanical actuators and generate a signal indicative of a user's input on the display device.

7. The apparatus of claim 1, wherein the display device comprises a capacitive sensing layer, and the apparatus further comprises an input sensing circuit coupled to the capacitive sensing layer and configured to generate a signal indicative of a user's input on the display device based, at least in part, on a measured capacitance of the capacitive sensing layer.

8. A transparent electromechanical actuator, comprising:
- a piezoelectric core;
- a first electrode attached to the piezoelectric core; and
- a second electrode, separate from the first electrode, attached to the piezoelectric core,
- wherein the piezoelectric core, the first electrode, and the second electrode are transparent,
- wherein the transparent electromechanical actuator is configured to receive a direct current signal at the first electrode and the second electrode and configured to generate haptic feedback based on the direct current signal,
- wherein the direct current signal is configured to cause the transparent electromechanical actuator to simulate a texture; and
- wherein the piezoelectric core is cylindrical.

9. The transparent electromechanical actuator of claim 8, wherein the piezoelectric core comprises a cylinder, and wherein the first electrode, the piezoelectric core, and the second electrode are stacked approximately along a long axis of the cylinder with the first electrode and the second electrode attached to opposing faces of the cylinder.

10. The transparent electromechanical actuator of claim 8, further comprising a haptic feedback control circuit configured to generate the direct current signal.

11. The transparent electromechanical actuator of claim 8, wherein the direct current signal is configured to generate a button through haptic feedback.

* * * * *